Patented Aug. 5, 1930

1,772,183

UNITED STATES PATENT OFFICE

JOHN CHRISTIAN KRANTZ, JR., OF BALTIMORE, MARYLAND, ASSIGNOR TO SHARP & DOHME, INC., OF BALTIMORE, MARYLAND, A CORPORATION OF NEW JERSEY

CONDIMENT

No Drawing.    Application filed September 25, 1928.  Serial No. 308,338.

This invention relates to a composition for use as a condiment on foods to replace sodium chloride or salt.

Common salt, which is relatively pure sodium chloride, has always been an element of human diet. Under normal conditions salt not only is not harmful when taken in moderate amounts as a condiment but it is an altogether proper part of a healthy diet. It is now known, however, that salt may be dangerous in certain pathological conditions. Consequently persons in such condition, particularly persons suffering from certain kidney disorders or having high blood pressure, are obliged to take their food entirely without salt.

Salt hunger seems to be a primary instinct, shared by all men and many of the animals. It is such an important part of our taste that to most people, if not to all, food without salt is tasteless, "flat" and unpalatable. Thus the necessity for adhering to a saltless diet imposes a very genuine hardship on persons suffering from such pathological conditions. Added to this sensuous hardship may be an impairment of health by reason of the fact that unpalatable food is less easily digested than that which is enjoyed.

It is an object of the present invention to provide a material which will satisfy the natural "salt hunger" and bring out the flavor of foods in the same way as ordinary salt, but which will be harmless when taken in moderate amounts even to persons suffering from serious ailments.

I have found that certain salts, particularly salts of fruit acids, are harmless when taken internally in small amounts and at the same time possess a saline taste similar to that of ordinary table salt. However, none of these salts, so far as I have been able to find, possess a taste which is wholly satisfying as a substitute for table salt. It has been my object to provide a material which would completely remove the hardship of a "saltless diet" and which would be practically indistinguishable from table salt when used with foods. My further researches have shown that this object can be substantially attained by mixing such salts in proportions adapted to supplement each the taste of the other so that a composite taste substantially identical to that of table salt can be obtained.

Sodium malate I have found to be particularly suitable for use in such mixtures since it possesses a strong saline taste which can be modified by additions of small amounts of other salts of fruit acids and/or inorganic salts.

The following example is a manner of utilizing my invention which I have found to be most satisfactory and one which produces a taste more closely similar to that of sodium chloride table salt than that of any other example which has been tried:

85.5 lbs. of sodium malate, 9 lbs. of sodium citrate, 5 lbs. of ammonium citrate, ½ lb. of manganese bromide, are ground to a #80 to 100 powder. The sodium and ammonium salts are preferably the neutral salts. The ingredients are then thoroughly mixed by sifting together. When the mixing is complete the resulting mixture is granulated by means of water moistening. The moistened material is forced thru a number thirty sieve and is then dried at a temperature not exceeding 80° C.

The resulting material is a white granular salt resembling table salt both in appearance and in taste. It may be sprinkled over food at the table in the same manner as is ordinary table salt, and when so used brings out the flavor of the foods in the same manner as ordinary table salt.

I claim:—

1. A composition of matter adapted for use as a condiment with foods which comprises a mixture of non-toxic salts of fruit acids, the composition having a taste similar to that of sodium chloride.

2. A composition of matter adapted for use as a condiment upon foods, which comprises a mixture of alkali salts of fruit acids, the composition having a taste similar to that of sodium chloride.

3. A composition of matter adapted for use as a substitute for table salt for seasoning foods which comprises sodium and ammonium salts of fruit acids, the composition having a taste substantially the same as sodium chloride salt.

4. A composition of matter adapted for use as a condiment to replace table salt, which comprises non-toxic salts of malic and citric acids.

5. A composition of matter adapted for use as a table salt, which comprises sodium malate with small amounts of other non-toxic salts adapted to make the taste of the composition more nearly the same as that of sodium chloride.

6. A composition of matter adapted for use as a table salt, which comprises sodium malate with a small amount of ammonium citrate adapted to make the taste of the composition more nearly the same as that of sodium chloride.

7. A composition of matter adapted for use as a table salt, which comprises sodium malate with small amounts of sodium and ammonium citrates and manganese bromide in proportions adapted to give the product a taste more nearly the same as that of sodium chloride.

8. As a new composition of matter, a white granular product consisting of about 85.5% sodium malate, 9% sodium citrate, 5% ammonium citrate and .5% manganese bromide.

In testimony whereof I affix my signature.

JOHN CHRISTIAN KRANTZ, Jr.